United States Patent
Vaughn

[19]

[11] Patent Number: 5,880,367
[45] Date of Patent: Mar. 9, 1999

[54] VEHICLE STEERING SENSOR DEVICE

[75] Inventor: Brian Kenneth Vaughn, Byron, Mich.

[73] Assignee: First Inertia Switch Limited, Grand Blanc, Mich.

[21] Appl. No.: 678,183

[22] Filed: Jul. 11, 1996

[51] Int. Cl.$^6$ .................................................. G01P 3/00
[52] U.S. Cl. ............... 73/488; 324/207.25; 324/207.15; 324/179; 324/173; 180/400; 280/771
[58] Field of Search .......................... 73/514.39, 514.31, 73/488; 310/68 B, 171; 116/31, 204; 324/173, 174, 207.11, 207.15, 207.2, 207.25, 207.13, 207.16, 207.17, 179; 180/400; 280/771

[56] References Cited

U.S. PATENT DOCUMENTS

| | | | |
|---|---|---|---|
| 5,121,054 | 6/1992 | Phillips et al. | 324/160 |
| 5,275,250 | 1/1994 | Müller et al. | 180/79 |
| 5,314,036 | 5/1994 | Kato et al. | 180/147 |
| 5,373,234 | 12/1994 | Kulczyk | 324/174 |
| 5,406,155 | 4/1995 | Persson | 310/68 B |
| 5,646,523 | 7/1997 | Kaiser et al. | 324/207.2 |

*Primary Examiner*—Hezron Williams
*Assistant Examiner*—Richard A. Moller

[57] ABSTRACT

A sensing device conveniently and accurately produces electrical signal representative of the direction in which he steerable wheels (10 and 11) of a vehicle are pointing and the rate of change of the direction of the steerable wheels. The device includes a circular or donut-shaped magnet (26) that is attached to the pinion (12) of a rack and pinion steering gear (6). The magnet has a plurality of magnetic poles (28) spaced around its circumference and preferably extending axially through the magnet. As the magnetic poles rotate past a plurality of sensors (36 and 38) that are located in quadrature positioning relative to the magnetic poles and to each other, the sensors generate electrical signals that are processed to determine the rotation direction of the pinion and the rate of such rotation.

8 Claims, 2 Drawing Sheets

VEHICLE STEERING SENSOR DEVICE

BACKGROUND OF THE INVENTION

Automotive vehicles have used hydraulic systems for many years to provide power assistance to the vehicle steering systems. The hydraulic systems typically consist of an engine driven pump that provides hydraulic fluid under pressure to an actuator which is connected into the steering system. A torsion bar senses the rotational torque and direction that the driver applies to the vehicle steering wheel, and appropriate hydraulic valving applies the hydraulic fluid in a manner that applies assisting forces to the steered wheels of the vehicle.

Over the years many improvements have been implemented to increase the efficiency and reduce the power consumption of the hydraulic systems. Despite these, the typical power steering system requires substantial amounts of energy because of inherent factors such as pumping losses.

Electrically assisted power steering systems offer increased efficiencies and packaging conveniences, and a great deal of development effort is being applied to prepare electrical power steering systems, also known as steer-by-wire systems, for the marketplace. Proposals for electrically powered vehicles add to this interest as the energy requirements of hydraulic power steering systems would likely prevent their use in electrically powered vehicles.

In a typical electrically assisted power steering system, angular displacement of the steering wheel is detected and converted into an electrical signal. The electrical signal is processed and applied to a servo motor that is attached to the steerable wheels of the vehicle. Much of the art of electrically assisted power steering systems is directed at devices for detecting the position and direction of rotation of the steering wheel, and at systems for processing and shaping the signals that are applied to the servo motor in efforts at duplicating the characteristics of the conventional steering system. U.S. Pat. No. 5,347,458 shows a steerby-wire system of interest in this regard.

Some work has been directed at providing electrical or electronic signals representative of the position of the steerable wheels of the vehicle. U.S. Pat. No. 5,275,250 discusses the use of potentiometers as position sensing devices for a vehicle steering control device. In U.S. Pat. No. 5,314,036, an elongated strip on the rack bar of a steering gear is designed with a signal pattern of magnetic characteristics. The rack bar is the output member of the steering gear and it is mechanically representative of the position of the steerable wheels of the vehicle. A sensor is located adjacent the strip and reads the magnetic characteristics in a manner that identifies the location of the rack bar and hence the angular location of the steerable wheels.

SUMMARY OF THE INVENTION

This invention provides a vehicle steering sensing device for identifying the steering direction and the rate of change of steering direction of the steerable wheels of a vehicle. The sensing device is inexpensive and is particularly applicable to the typical rack and pinion steering gear of automotive applications.

The sensing device comprises a circular magnet attached to and rotatable with the pinion of a rack and pinion steering gear. The pinion of the steering gear is mechanically connected to the steerable wheels by typical means. The circular magnet has multiple magnetic poles spaced around its circumference. A plurality of stationary sensors are positioned adjacent the magnet.

Rotation of the steering wheel of the vehicle is transmitted mechanically, electrically, or by any other means to the pinion of the steering gear. As the pinion rotates, the circular magnet rotates past the sensors and the poles of the magnet produce electronic pulses in the sensors.

The stationary sensors preferably are positioned within a nonmagnetic housing that surrounds and protects the circular magnet. The sensors consists of at least two magnetoresistive sensing devices that are positioned in what is known as quadrature phase with respect to the magnetic poles of the magnet. This involves locating the sensors so that they are 90 degrees out of phase relative to the magnetic poles of the magnet. This arrangement is such that when one sensor is at the leading edge of a magnetic pole and is about to begin producing a pulse, the other is at the mid-point of the pulse produced by a magnetic pole.

A printed circuit board with appropriate electronics can be installed in the nonmagnetic housing axially outward of the pinion. This construction produces a compact and integrated structure for the sensing device. Electronic circuitry on the printed circuit board processes the electrical pulses in accordance with known procedures to produce electrical signals that represent the direction of rotation and the rate of rotation of the pinion. These signals can be combined with data previously generated to produce electrical information about the directional position of the steerable wheels and the rate of change directional position.

DETAILED DESCRIPTION

Figure 1:
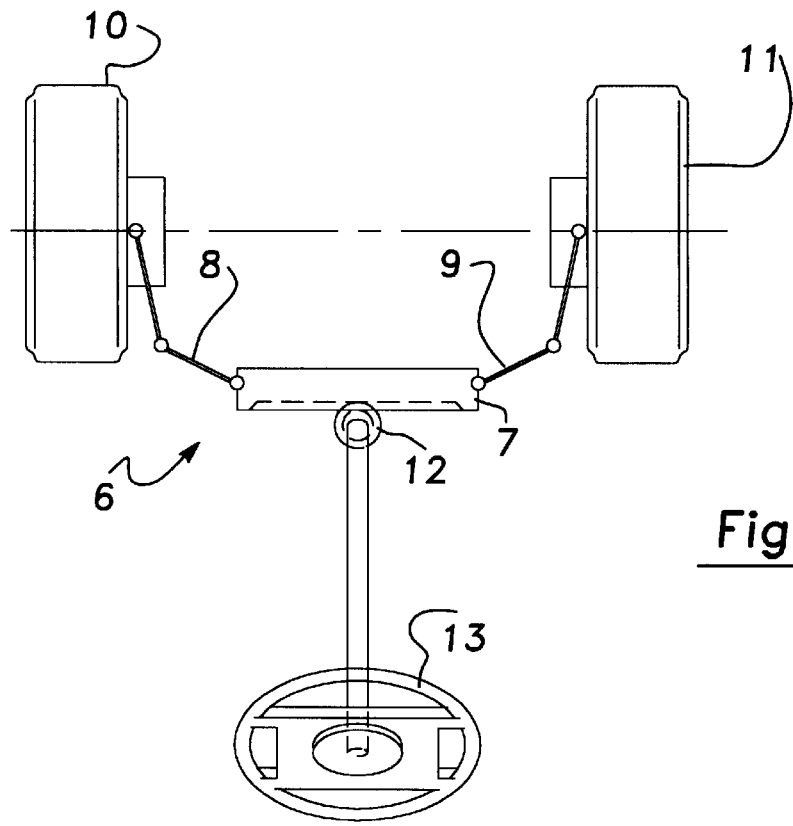
FIG. 1 is a perspective of a typical vehicle steering system equipped with the sensing device of this invention.

Referring to FIG. 1, a rack and pinion steering gear 6 has its rack bar 7 mechanically connected by linkage 8 and 9 to the steerable wheels 10 and 11 of a vehicle. The pinion 12 of gear 6 is connected to a driver actuable steering wheel 13.

Figure 2:
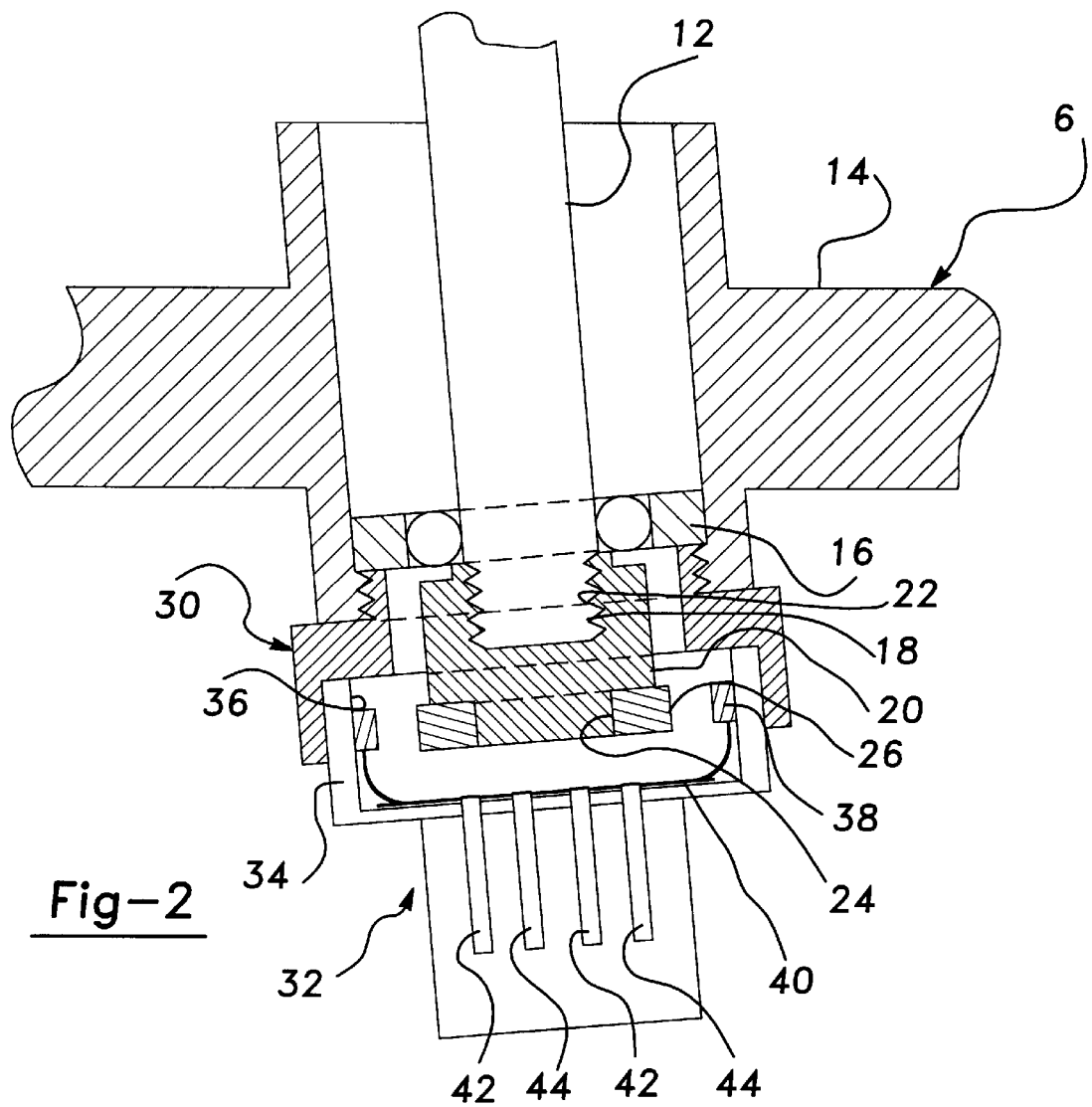
FIG. 2 is a partial cross-section of a typical automotive steering gear that shows an installation of a sensing device of this invention.

Referring to FIG. 2, steering gear 6 has a housing 14 that is fastened to the vehicle. Pinion 12 is supported within housing 14 by appropriate bearings, with the lower bearing shown for reference and designated by numeral 16.

The portion of pinion 12 outboard of the lower bearing is threaded at 18. A cup-shaped sensor nut 20 has interior threads 22 on its cup portion that threadably engage the threads 18 of pinion 12. A shoulder 24 is machined on the other end of sensor nut 20 and a ring-shaped magnet 26 is pressed onto the shoulder.

Figure 3:
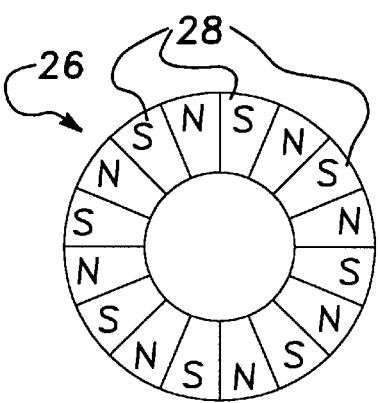
FIG. 3 is a perspective view of a magnet that has magnetic poles spaced around its circumference.

Referring to FIG. 3, ring-shaped magnet 26 has several magnetic poles 28 spaced around its circumference. Magnetic poles 28 preferably are established about the outer circumference and extend axially through the magnet 26. A typical magnet has an OD of 1 inch, an ID of 0.5 inch, a thickness of 0.25 inch, and can be made of ferrite, ceramic, or rare earth magnet alloys. Magnet 26 typically has a minimum of ten magnetic poles, and in a preferred embodiment a magnet with thirty magnetic poles is used.

Returning to FIG. 2, an upper case 30 made of nonmagnetic material such as an acetal resin has a cup-shaped cross-section and is threaded into a projection of gear housing 14. A lower case 32 also made of nonmagnetic material has a skirt portion 34 that is pressed and staked into the lower portion of upper case 30. Skirt portion 34 fits radially outboard of magnet 26, and two sensors 36 and 38 are fastened to the inner surface of the skirt portion 34 where the sensors will generate electrical signals when the magnetic poles 28 of magnet 26 rotate past the sensors.

Sensors 36 and 38 are positioned so they are ninety degrees out of phase relative to the magnetic poles 28 of magnet 26. In other words, the sensors are positioned so that when one sensor is at the leading edge of a magnetic pole and is about to begin producing a pulse, the other is at the mid-point of the pulse produced by a magnetic pole. This is traditional quadrature electrical positioning. So long as this quadrature positioning is maintained, the sensors can be located in any angular relationship to each other (i.e., they can be closely adjacent to each other, nearly radially across from each other, or at a number of intermediate positions).

A PC board 40 is mounted within lower case 32. Each sensor is connected to an input terminal of the PC board. The output of PC board 40 is applied to exterior terminals 42 and 44 that are positioned on or extend to the exterior of the lower case.

Figure 4:
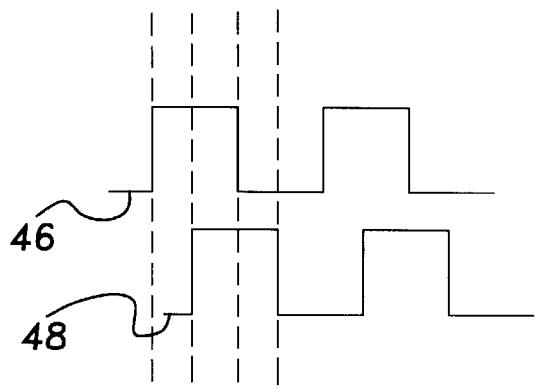
FIG. 4 is a graphic display of the pulses from the sensors.

During operation steering wheel input rotates magnet 26 which moves magnetic poles 28 past sensors 36 and 38. As each magnetic pole passes a sensor, the sensor produces an electrical pulse. The location of the magnetic poles in the circumference of the magnet and the axial alignment of the magnetic poles produces sharp alternating pulses in the sensors. These pulses are portrayed graphically after electronic processing in FIG. 4, where electrical signals from sensor 36 are represented by line 46 and electrical signals from sensor 38 are represented by line 48. As noted above, the sensors are located so they are out of phase with each other by ninety degrees and accordingly the pulses of line 48 lag the pulses of line 46 by ninety degrees as portrayed in the figure.

Electronic circuitry on PC board 40 can be used to analyze the pulses to determine the direction of rotation of the magnet. This is apparent from consideration of FIG. 4. If sensor 36 is producing a pulse (line 46) when sensor 38 begins to produce a pulse (line 48), the magnet is rotating in one direction. If sensor 38 is producing a pulse when sensor 36 begins to produce a pulse, the magnet is rotating in the opposite direction. This processing is known as quadrature. Useful quadrature circuitry can be found in Design a Robust Quadrature Encoder, Bill Marty, Electronic Design, Jun. 24, 1993, pp. 11 et seq. or in Magnetic Rotary Position Encoders with Magneto-Resistive Sensors, P. Campbell, Proceedings of the Fourth International Conference on Electrical Machines and Drives, IEEE Trans (UK), 1989. The frequency of the pulses determines the speed of rotation in traditional fashion. The output from PC board 40 can be used for any of several purposes. In a typical vehicle hydraulic power steering system with mechanical connection of the steering wheel to the steering gear, the output can be used to modify the hydraulic power assist according to the position of the steerable wheels and thereby shape vehicle handling and performance. Traction control systems and intelligent suspension systems can use the signals to obtain control and performance that reflects the steering dynamics of the vehicle. Vehicle steering systems with electrical connection of the steering wheel to the steering gear (known as steer-by-wire systems) can use the output to provide positive feedback of the position and the dynamics of the steerable wheels of the vehicle.

Several modifications of the preferred embodiment can be implemented to achieve additional improvements. The number of magnetic poles generally determines the sensitivity of the sensing device. A device with ten magnetic poles is quite suitable for most automotive applications although sensitivity can be improved significantly by increasing the number to thirty. The magnetic poles of the magnet can extend axially through the magnet instead of radially to achieve different packaging as desired.

I claim:

1. A vehicle steering sensing device for identifying the steering direction and the rate of change of steering direction of the steerable wheels (10 and 11) of a vehicle comprising a steering gear (6) having a pinion (12) mechanically connected to the steerable wheels (10 and 11), a circular magnet (26) having multiple magnetic poles (28), said magnet being attached to and rotatable with the pinion (12), a plurality of stationary sensors (36 and 38) positioned to sense movement of the magnetic poles of the magnet past the sensors, said sensors being positioned in quadrature phase with respect to the magnetic poles (28) of circular magnet (26) so that one of the sensors is at the leading edge of a magnetic pole and is about to begin producing a pulse when another sensor is at the mid-point of a pulse, and electronic circuitry for processing the pulses produced by the sensors to identify the steering direction and the rate of change of the steering direction of the vehicle.

2. The sensing device of claim 1 in which the magnetic poles (28) extend axially through the outer circumference of the circular magnet (26).

3. The sensing device of claim 2 in which the circular magnet (26) has at least ten magnetic poles.

4. The sensing device of claim 3 in which the sensors are mounted in a nonmagnetic housing (30) that surrounds the magnet (26) and a printed circuit board (40) with electronic processing components for processing the pulses from the sensors is located within the housing.

5. The sensing device of claim 4 in which the circular magnet (26) has thirty poles.

6. The sensing device of claim 1 in which the circular magnet has at least ten magnetic poles.

7. The sensing device of claim 1 in which the sensors (36 and 38) are mounted in a nonmagnetic housing (30) that surrounds the magnet and a printed circuit board (40) with electronic processing components for processing the pulses from the sensors is located within the housing.

8. The sensing device of claim 1 in which the circular magnet (26) has at least thirty poles.

* * * * *